United States Patent
Rosu et al.

(10) Patent No.: US 8,694,980 B2
(45) Date of Patent: *Apr. 8, 2014

(54) EFFICIENT EGONET COMPUTATION IN A WEIGHTED DIRECTED GRAPH

(75) Inventors: Marcel C. Rosu, Ossining, NY (US); Hanghang Tong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/547,656

(22) Filed: Jul. 12, 2012

(65) Prior Publication Data
US 2013/0346467 A1    Dec. 26, 2013

Related U.S. Application Data

(63) Continuation of application No. 13/533,697, filed on Jun. 26, 2012.

(51) Int. Cl.
*G06F 9/45* (2006.01)
(52) U.S. Cl.
USPC ............................. 717/156; 717/144; 717/157
(58) Field of Classification Search
USPC .................................................. 717/144, 156
See application file for complete search history.

(56) References Cited

U.S. PATENT DOCUMENTS

| | | | | |
|---|---|---|---|---|
| 5,475,842 | A * | 12/1995 | Gilbert et al. | 717/160 |
| 6,085,147 | A * | 7/2000 | Myers | 701/528 |
| 6,792,419 | B1 * | 9/2004 | Raghavan | 1/1 |
| 7,043,621 | B2 * | 5/2006 | Merchant et al. | 711/173 |
| 7,548,985 | B2 | 6/2009 | Guigui | |
| 7,593,341 | B1 * | 9/2009 | Buriol et al. | 370/238 |
| 7,974,978 | B2 | 7/2011 | Yan et al. | |
| 2006/0036564 | A1 | 2/2006 | Yan et al. | |
| 2006/0224562 | A1 | 10/2006 | Yan et al. | |
| 2011/0103682 | A1 | 5/2011 | Chidlovskii et al. | |
| 2011/0105143 | A1 | 5/2011 | Harple et al. | |
| 2011/0208848 | A1 | 8/2011 | Feng et al. | |

FOREIGN PATENT DOCUMENTS

WO    2008137590 A2    11/2008

OTHER PUBLICATIONS

W De Nooy, "Social Network Analysis, Graph Theoretical Approaches to", 2009.*
Gjoka et al., "A Walk in Facebook: Uniform Sampling of Users in Online Social Networks", 2011.*

(Continued)

*Primary Examiner* — Phillip H Nguyen
(74) *Attorney, Agent, or Firm* — Yee & Associates, P.C.; Anne Dougherty (57) ABSTRACT

An embodiment of the invention pertains to a weighted directed graph comprising multiple nodes and edges that each extends between two nodes. The embodiment includes processing edges to generate a forward and reverse edge corresponding to each edge. Forward and reverse edges are processed to generate indirect edges, each comprising two edge components, and extending between two nodes. One node associated with each forward edge, each reverse edge, and each indirect edge is selected to be the key node of its associated edge. All forward, reverse and indirect edges having a particular node as their respective key nodes are placed into a group. All edges of the group are then selectively processed to provide information pertaining to an egonet of the graph that has the particular node as its egonode.

9 Claims, 8 Drawing Sheets

(56) References Cited

OTHER PUBLICATIONS

Akoglu et al., "OddBall: Spotting Anomalies in Weighted Graphs," Proceedings of the 14th Pacific-Asia Conference on Advances in Knowledge Discovery and Data Mining (PAKDD '10), Jun. 2010, vol. 2, 12 pages.

Chakrabarti, "AutoPart: Parameter-Free Graph Partitioning and Outlier Detection," Proceedings of the 8th European Conference on Principles and Practice of Knowledge Discovery in Databases (PKDD '04), Nov. 2004, vol. 322, 12 pages.

Henderson et al., "It's Who You Know: Graph Mining Using Recursive Structural Features," Proceedings of the 17th ACM SIGKDD International Conference on Knowledge Discovery and Data Mining (KDD '11), Aug. 2011, pp. 663-671.

Lin et al., "SmallBlue: Social Network Analysis for Expertise Search and Collective Intelligence," IEEE 25th International Conference on Data Engineering (ICDE '09), Mar. 2009, pp. 1483-1486.

Noble et al., "Graph-Based Anomaly Detection," Proceedings of the 9th ACM SIGKDD International Conference on Knowledge Discovery and Data Mining (SIGKDD '03), Aug. 2003, 7 pages.

Rosu et al., "Efficient Egonet Computation in Weighted Directed Graph", U.S. Appl. No. 13/533,697, filed Jun. 26, 2012, 33 pages.

* cited by examiner

EDGE SELECTED FROM DIRECTED WEIGHTED GRAPH

ORIGINAL + DERIVED EDGES

'DIRECT' EDGES:

INPUT DERIVED FROM THE 1ST-DEGREE EGONET'S INCOMING AND OUTGOING EDGES:

(a) FORWARD$^2$ ($F^2$):  ($\{n_{x,1}, n_{x,2}, \ldots n_{x,i}\}, n_y$), DERIVED FROM FF AND RF EDGES (b) FORWARD$^2$ ($F^2$):  ($n_y, \{n_{x,1}, n_{x,2}, \ldots n_{x,j}\}$), DERIVED FROM RR AND FR EDGES

ORIGINAL + DERIVED EDGES

DIRECT EDGES: ⎯⎯ KEY: SET OF ONE NODE

F:  ($\{n_k\}, n_l$) IFF ($n_k, n_l$) AN EDGE IN THE INPUT GRAPH

R: ($\{n_l\}, n_k$) IFF ($n_k, n_l$) AN F-EDGE

⎯⎯ KEY: SET OF ONE NODE $F_a^2, F_b^2$ EDGES (SEE THE DEFINITION ABOVE)

$F_a^2, F_a^2 R, FF_b^2$ AND $RF_b^2$ EDGES DERIVED FROM: $F_a^2$ OR $F_b^2$ EDGES AND F OR R EDGES

FOUR (4) MAP/REDUCE STAGES ARE REQUIRED FOR COMPUTATION, WITH THE FIRST TWO STAGES ALMOST IDENTICAL TO THE DEGREE-ONE EGONET COMPUTATION

EFFICIENT EGONET COMPUTATION IN A WEIGHTED DIRECTED GRAPH

This application is a continuation of and claims the benefit of priority to U.S. patent application Ser. No. 13/533,697, filed on Jun. 26, 2012 and entitled "EFFICIENT EGONET COMPUTATION IN A WEIGHTED DIRECTED GRAPH". The contents of which are hereby incorporated by reference.

This invention was made with Government support under Contract No.: W911NF-11-C-0200 awarded by Department of Defense (DOD)). The Government has certain rights in this invention.

BACKGROUND

1. Field

The invention disclosed and claimed herein generally pertains to a method and apparatus for computing information pertaining to nodes of a weighted directed graph, such as a large social network graph. More particularly, the invention pertains to efficient computation of egonets in graphs of these types.

2. Description of the Related Art

A weighted directed graph generally comprises a number of nodes, and further comprises weighted edges that each extends from one of the nodes to another node. A weighted directed graph such as a social network can have a very large number of nodes, which may be on the order of millions or even billions of nodes. Also, social networks can have very important roles in fields exemplified by but not limited to healthcare, financial activities and crime prevention. It is therefore desirable to have tools available for processing graphs of these types with a high level of efficiency, in order to access and use important information contained in such graphs.

A weighted directed graph as described above comprises a number of neighboring subgraphs, which are referred to as egonets. Computing respective egonets of a large social network can be a very important activity, such as to find or discover anomalies. However, currently used solutions typically compute the egonets one at a time. These approaches tend to be very tedious and time-consuming, particularly when used for large graphs as referred to above.

SUMMARY

Embodiments of the invention provide an algorithm for computing in parallel the neighbor subgraph, or egonet, of each node in a directed weighted graph. Embodiments also can compute a significant number of characteristic features for each egonet. In one embodiment, a method is provided for computing specified information pertaining to respective nodes of a weighted directed graph, wherein the graph comprises multiple nodes and edges, each edge extending between two nodes and having a weight. The method includes the step of selectively processing the edges to generate a forward edge and a reverse edge that both correspond to each edge, wherein the forward edge and reverse edge corresponding to a given edge both extend between the same two nodes as the given edge. The method further includes selectively processing forward edges and reverse edges to generate multiple indirect edges, wherein each indirect edge comprises two edge components, and has two ends respectively associated with different nodes. The method includes the further step of specifying one node associated with each forward edge, one node associated with each reverse edge, and one node associated with each indirect edge to be the key node of its respective associated edge. All the forward, reverse and indirect edges that have the same particular node as their respective key nodes are placed into a group, and are then selectively processed to provide specified information pertaining to a particular egonet of the graph, wherein the particular node is the egonode of that particular egonet.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagrams.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
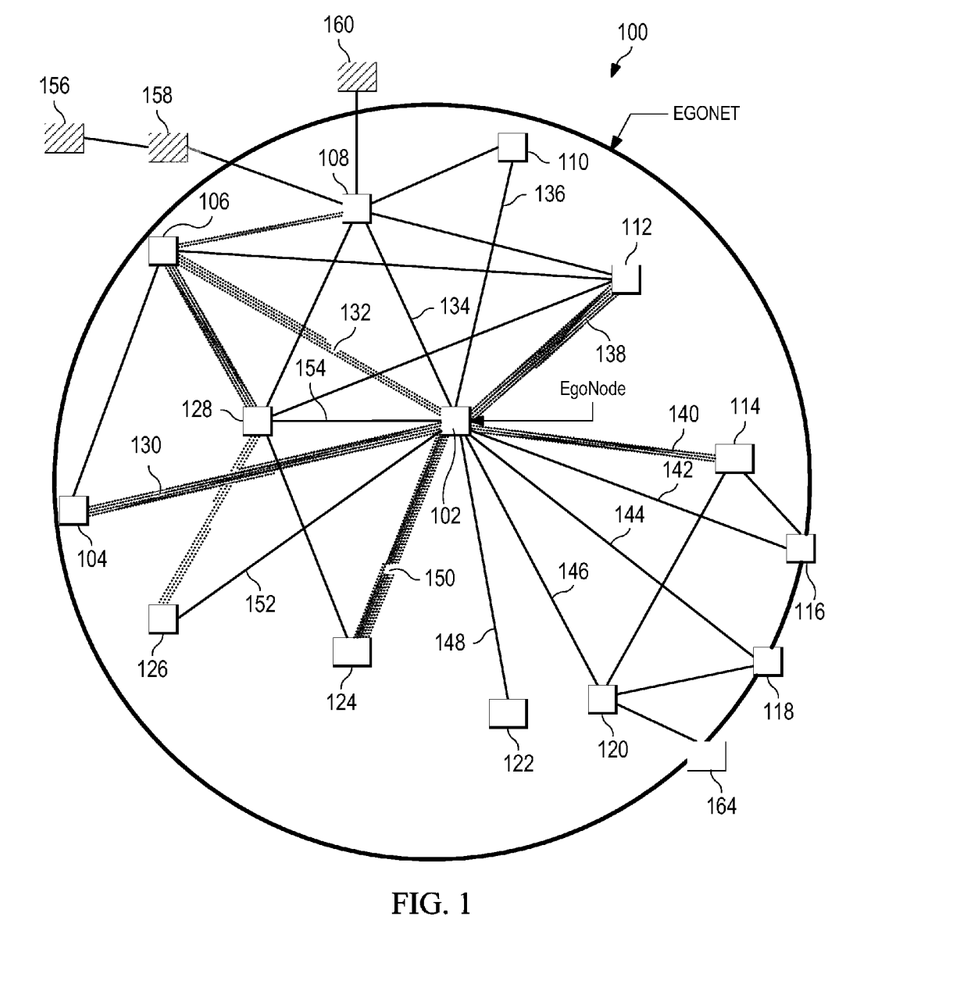
FIG. 1 is a schematic diagram showing an egonet of a directed weighted graph, wherein information pertaining to features of the egonet can be computed by an embodiment of the invention.

Referring to FIG. 1, there is shown a first degree egonet 100, which comprises a subgraph of a directed weighted graph such as a large social network graph as described above. Egonet 100 comprises a node set that includes an egoNode 102, and all other nodes of the graph which are immediate neighbors of egoNode 102. A node is an immediate neighbor of egoNode 102 if and only if it is directly connected to the egoNode by an edge. Accordingly, nodes 104-128 of egonet 100 are all immediate neighbors of egoNode 102. Each of these nodes is directly connected to egoNode 102 by edges 130-154, respectively.

FIG. 1 further shows that nodes 156-160 and 164, each of which lies outside the egonet 100, are not directly connected to egoNode 102 by any edge. Thus, none of these nodes are included in the node set of egonet 100. Instead, they belong to other egonets or subgraphs, of the over-all network graph that includes egonet 100.

The edges 130-154, together with all other edges between any two immediate neighbors of egoNode 102, collectively comprise the edge set of egonet 100. FIG. 1 also shows that some edges have different thicknesses than other edges. For example, edge 138 is shown to be substantially thicker than edges 148 and 152. Each of the edges has a weight associated with it, and the thickness of a weight is selected to indicate a measure of its relative weight. Moreover, each edge has a direction. Of the two nodes associated with an edge, one is a source node and the other is a destination node, and the edge is directed from the source node to the destination node.

As described hereinafter in further detail, embodiments of the invention can process data contained in egonet 100 and the like to achieve a number of useful objectives. For example, information provided by an embodiment could be used for visualization and browsing in social network analysis. Alternatively, embodiments of the invention could be used for anomaly detection, in connection with health care, crime prevention, financial fraud detection, or cyber-security. Embodiments may also be used to generate semantic or behavioral features for graph analytics applications.

Figure 2:
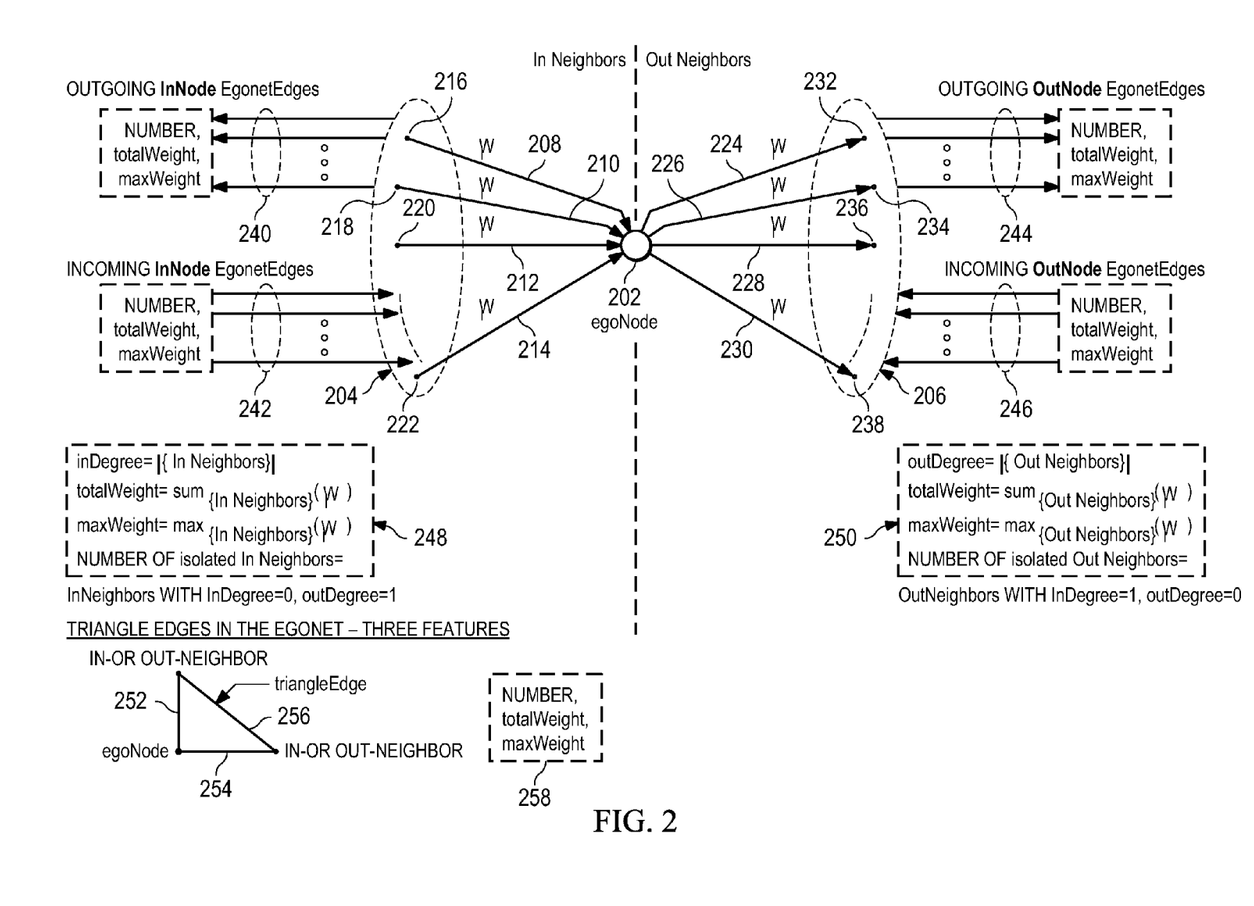
FIG. 2 is a schematic diagram illustrating features and information provided for the egonet of FIG. 1 by an embodiment of the invention.

Referring to FIG. 2, there is shown a first-degree egonet egoNode 202, such as egoNode 102 of FIG. 1, together with its immediate neighbors as described above in connection with FIG. 1. However, these neighbors are further divided into two groups in FIG. 2, for purposes of illustration. More particularly, a neighbor node is an In Neighbor 204 to the egoNode 202, if the neighbor is the source node and the egoNode is the destination node, for an edge extending between these two nodes. This is illustrated in FIG. 2 by the edges 208-214, which are directed to egoNode 202 from In Neighbor nodes 216-222, respectively.

In similar manner, a neighbor node is an Out Neighbor 206 to egoNode 202, if the neighbor is the destination node and the egoNode 202 is the source node for an edge extending between these two nodes. This is illustrated in FIG. 2 by the edges 224-230, which are directed from egoNode 202 to Out Neighbor nodes 232-238, respectively.

Referring further to FIG. 2, it is seen that the In Neighbor and Out Neighbor node groups are each further divided into subgroups. Each neighbor node is placed into a subgroup, according to whether it has an edge that is outgoing from the egonet of EgoNode 202, or has an edge that is incoming to such egonet. In order to compute the egonet for a given egoNode, it is very important to have knowledge of respective outgoing and incoming edges. Accordingly, embodiments of the invention determine certain information for each of the above subgroups of FIG. 2.

More particularly, for each subgroup, the embodiment determines the total number of outgoing or incoming edges, the total weight of all such edges, and the maximum weight of the edge having the greatest weight. Thus, edges 240 collectively provide this information for outgoing In Node Edges, and edges 242 provide such information for incoming In Node Edges. Edges 244 and 246 provide such information for outgoing and incoming Out Node Edges, respectively.

After the above information has been determined for all of the In Neighbors, cumulative totals 248 are provided for each information category. In addition to the edge weight information, the totals 248 indicate the total number of In Neighbor nodes in the egonet, and also the number of isolated In Neighbor nodes. The isolated In Neighbor nodes are nodes that are connected to only one other node by an edge which is directed from the isolated node to the egoNode.

Similarly, cumulative totals 250 are provided for each category of the Out Neighbor nodes. These include the total edge weight information, the total number of Out Neighbor nodes in the egonet, and the total number of isolated Out Neighbor nodes.

In addition to incoming edges and outgoing edges as described above, an egonet may include triangle edges. These are edges that connect the other ends of two incoming or outgoing edges of the egoNode, as illustrated by edges 252 and 254 of FIG. 2. A triangle edge 256 thus extends between two neighbor nodes of the egoNode, which may be either In or Out Neighbors. In computing an egonet, it is essential to identify each triangle edge contained in the egonet, and to provide the information 258. This information includes the total number of triangle edges in the egonet, the total weight thereof, and the weight of the triangle edge of greatest weight. An embodiment of the invention computes information pertaining to triangle edges as described hereinafter in further detail.

The algorithm of the embodiment also computes the leading eigenvalue of the adjacency matrix of the egonet. The adjacency matrix is a means for representing nodes of a graph that are adjacent to other nodes.

Figure 3:
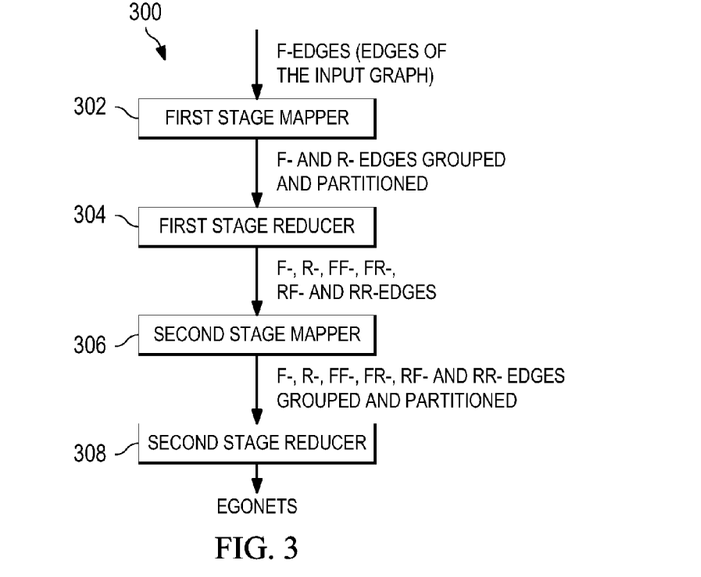
FIG. 3 is a simplified block diagram showing components that may be used to carry out map and reduce functions, in order to implement an embodiment of the invention.

Referring to FIG. 3, there is shown a chain 300 comprising two map-reduce jobs, configured as a first stage and a second stage. As is known by those of skill in the art, a map-reducer is a framework which can be used to process highly distributable problems across huge datasets, using multiple computers. Prior to any computation steps, input data is distributed across the multiple computers. During a map step, a master computer node directs the worker computer nodes to process data stored locally. After the map step, the infrastructure groups the outputs of the map step by keys defined by the map step and redistributes the groups among the worker nodes according to the key values. During a reduce step, the master node directs the worker nodes to process the local groups of data; the output of the worker nodes during the reduce step is stored locally. After the computation steps are completed, the master node collects answers to all the sub-problems, and combines them to form an output.

Referring further to FIG. 3, there is shown the first stage map-reduce operation comprising a first stage mapper 302, and a first stage reducer 304. The first stage is followed sequentially by a second stage map-reduce operation, comprising a second stage mapper 306 and second stage reducer 308. FIG. 3 shows first stage mapper 302 provided with respective edges of a graph as its input, and further shows second stage reducer 308 providing information as an output which defines or pertains to respective egonets of the input graph. Operation of the respective map-reduce components, in order to provide this output from the given inputs, is described hereinafter in further detail.

In order to compute the complete egonet of a given node of a directed weighted graph, as described above, it is necessary to identify each edge that is outgoing from the given node, and also each edge that is incoming to the given node. Thus, each edge of the original graph must be indexed or referenced by both the identity of its source node, and the identity of its destination node. In accordance with embodiments of the invention, this is achieved at least in part by replicating each edge of an original or input graph, as described hereinafter in connection with FIG. 4.

Figure 4:
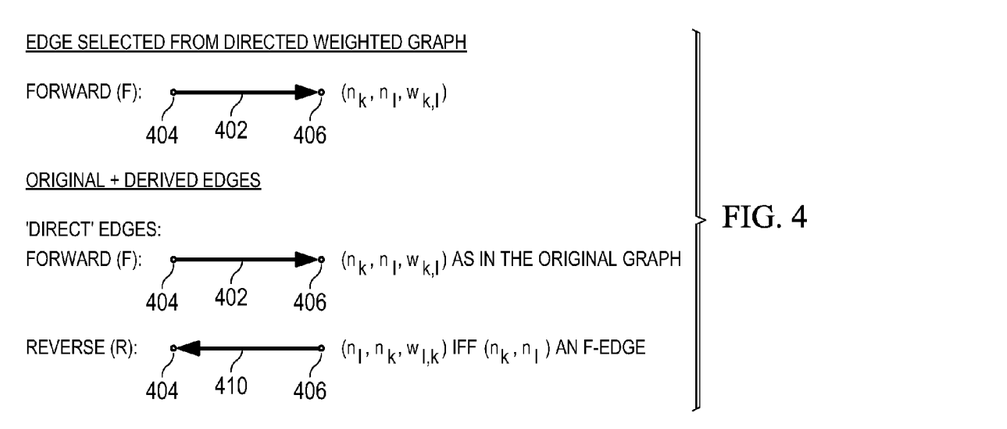
FIGS. 4-7 are schematic diagrams illustrating the construction and use of forward, reverse and indirect edges, to compute characteristics or features of an egonet in accordance with an embodiment of the invention.

Referring to FIG. 4, there is shown an edge 402 selected from an original directed weighted graph, which is to be used as an input for a process to compute respective egonets of the graph. Edge 402 has a source node $n_k$, also referenced as node 404, a destination node $n_l$, also referenced as node 406, and a weight $W_{k,l}$. Original edge 402 is referred to in FIG. 4 as a Forward (F) edge. Moreover, edge 402 is represented by the triple $(n_k, n_l, W_{k,l})$, and is therefore indexed or identified by its source node, $n_k$.

As an important initial step of a method or algorithm of an embodiment of the invention, each Forward edge of the original graph is replicated to derive a pseudo Reverse (R) edge, as further shown by FIG. 4. More particularly, FIG. 4 shows a Reverse edge 410 placed for comparison with Forward edge 402. Reverse edge 410 has the same weight as Forward edge 402, but extends in the opposite direction, from destination node $n_l$ to source node $n_k$. Thus, Reverse edge 410 is represented by the triple $(n_l, n_k, W_{l,k})$, and is therefore indexed by destination node $n_l$, or node 406, rather than source node $n_k$, or node 404.

In a useful implementation, Reverse edges are generated from input forward edges of the original graph by the first stage mapper 302 of the first stage map-reduce operation shown by FIG. 3. By providing Forward and Reverse edges for each edge of the graph, the objective described above, of enabling each edge to be indexed by both its source node and its destination node, is achieved. The Forward and Reverse edges are referred to as direct edges, because they both describe a relationship between two adjacent graph nodes.

Figure 5:
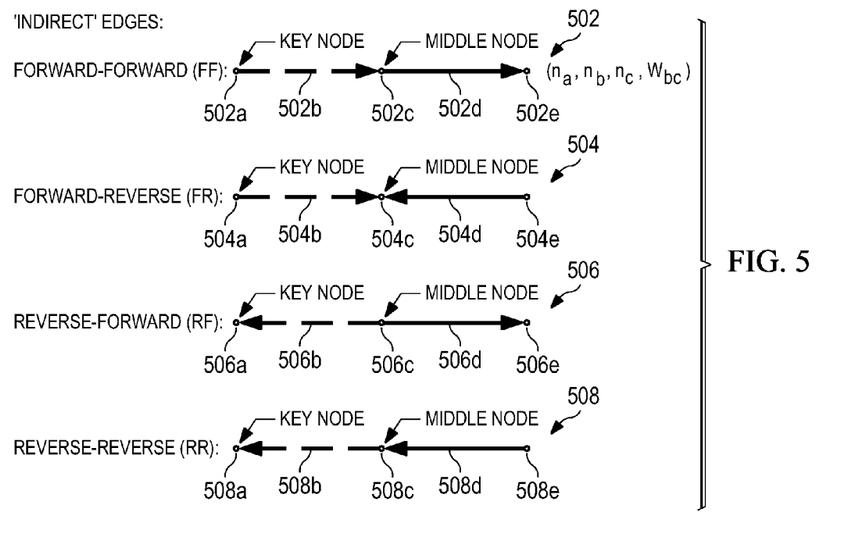

Referring to FIG. 5, there is shown a set of indirect edges 502-508, or pseudo edges, which are each constructed by combining or concatenating two Forward or Reverse edges. More particularly, Forward-Forward (FF) edge 502 is formed by combining Forward edge components 502b and 502d. Forward-Reverse (FR) edge 504 comprises Forward edge 504b and Reverse edge 504d; Reverse-Forward (RF) edge 506 comprises Reverse edge 506b and Forward edge 506d; and Reverse-Reverse (RR) edge 508 comprises Reverse edges 508b and 508d.

It is to be appreciated that two Forward or Reverse edge components can be combined into one of the above types of indirect edges, only if the second element of the triple representing the first F- or R-edge component is the same as the first element of the triple representing the second F- or R-edge component. For example, if nodes 502a and 502c of Forward edge 502b are $n_a$ and $n_b$, respectively, and the weight thereof is $W_{ab}$, the triple for edge 502b would be $(n_a, n_b, W_{ab})$. In like manner, if nodes 502c and 502e of Forward edge 502d are $n_b$ and $n_c$, respectively, and the weight thereof is $W_{bc}$, Forward edges 502b and 502d could be combined to construct the FF indirect edge 502, as shown by FIG. 5. The quadruple representing this FF edge would be $(n_a, n_b, n_c, W_{bc})$.

More generally, FIG. 5 shows the common node, of the two edge components which form each indirect edge 502-508 to be a middle node. Thus, nodes 502c-508c are shown to be the middle nodes, respectively, for the indirect edges 502-508. For each node in the graph that can be a middle node, the algorithm of an embodiment of the invention generates all paths of length two that are centered on the middle node, regardless of the direction of the two edges in the path.

Usefully, respective indirect FF-, FR-, RF- and RR-edges are generated by the first stage reducer 304 of the first stage map-reduce operation, from Forward and Reverse edges that are input to first stage reducer 304 from first stage mapper 302. Also, first stage reducer 304 provides an output comprising indirect edges and Forward and Reverse edges, wherein a specific node of each edge has been assigned or specified to be the key node of that edge. For each forward and reverse edge, the key node is selected to be the indexing node thereof, as described above. For each indirect edge, the key node is selected to be left most node thereof, as viewed in FIG. 5. Thus, nodes 502a-508a are the key nodes of indirect edges 502-508, respectively.

After a key node has been specified for each direct and indirect edge, all edges which have the same key node are placed into a common group. By processing data furnished by respective edges of the group in accordance with a method of the invention, a great deal of useful information can be obtained in regard to an egonet of the graph, wherein the key node for edges in the group is the egoNode of that egonet. For example, as described above, an egonet can include triangle edges and also incoming and outgoing edges. By selectively comparing Forward and Reverse edges against respective indirect edges of the group, useful information regarding these features can be efficiently acquired.

Figure 6:
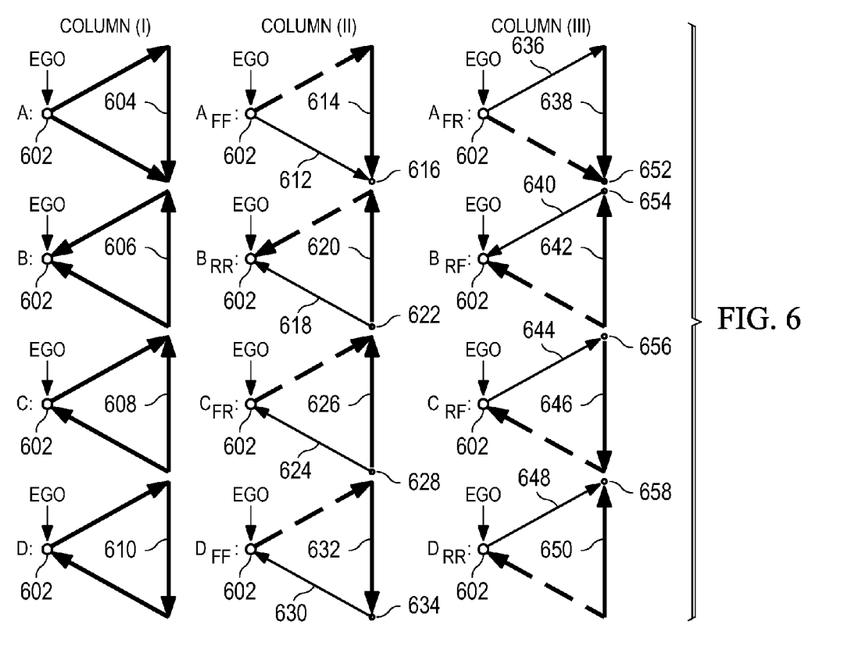

Referring to FIG. 6, there is shown in column (I) as an example, four different configurations A-D which three graph edges could have in an egonet, wherein two of the edges are adjacent or connected to the egoNode 602 of the egonet, and the third edge is a triangular edge. The triangular edges are referenced as edges 604-610 for configurations A-D, respectively.

Referring to column (II) of FIG. 6, there is shown a mapping of the four configurations A-D to a pair comprising one F- or R-direct edge, and one indirect edge. The F- and R-edges are represented as thin arrows, while the indirect edges are represented as a pair of dotted and thick arrows, connected at their common node. Thus, the mapping of configuration A uses a Forward edge 612 and an FF-edge 614, which both extend from the egonode 602 to a neighbor node 616. An R-edge 618 and an indirect RR-edge 620 are used to map configuration B, to a node 622. Configuration C is mapped to a node 628 by an R-edge 624 and an FR-edge 626, and configuration D is mapped to a node 634 by an R-edge 630 and an FF-edge 632.

Referring further to FIG. 6, and in particular to the mapping of configuration A in column (II), it will be seen that a process can be set up, wherein direct forward edge 612 is successively compared with each of respective indirect edges, which are included in a group of edges that all have the same key node. This comparing process could take place very quickly. When the edge 612 is compared with indirect edge 614, a match will occur, since both edges extend to the same node 616. This match will confirm that an edge extends between two neighbor nodes of egoNode 602, which is a requirement for an edge to be a triangle edge in an egonet. The triangle edge comprises the thick arrow portion of the FF-edge, which is shown as a downward directed arrow in FIG. 6.

Column (II) further shows that similar matches will occur for configurations B-D, during the process of comparing successive indirect edges with a direct edge. These matches will occur when the direct edges 618, 624 and 630 are respectively compared with the corresponding indirect edges 620, 626, and 632 shown in column (II). Each match indicates that the indirect edge includes a triangle edge for the egonet.

Column (III) illustrates an alternative mapping of the configurations A-D, again using a pair of edges comprising one direct edge and one indirect edge. Configuration A is mapped using F-edge 636 and FR-edge 638; configuration B is mapped using R-edge 640 and RF-edge 642; configuration C is mapped using F-edge 644 and RF-edge 646; and configuration D is mapped using F-edge 648 and RR-edge 650. For each configuration, a match is found when it is recognized the direct and indirect edges extend to the same node. For configurations A-D, these are nodes 652-658, respectively. Each of the matches confirms that the indirect edge includes a triangle edge for the egonet.

Figure 7:
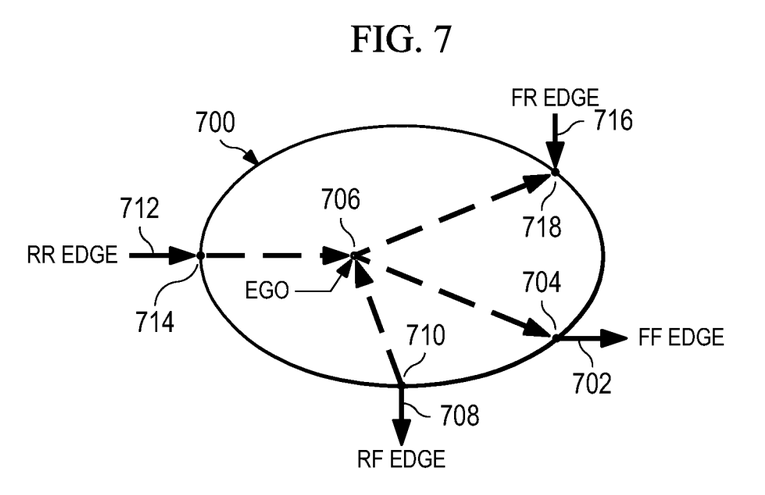

If an indirect edge is determined not to be a triangle edge of the egonet, such as by using the comparing process described above, then the indirect edge must include an edge that is incoming to the egonet, or is outgoing from the egonet. Referring to FIG. 7, it is seen that both FF- and RF-edges that are not triangle edges are both outgoing from egonet 700. More particularly, a component 702 of an FF-edge is shown to be an outgoing edge from node 704, which is a neighbor node to egoNode 706. Similarly, a component 708 of an RF-edge is an outgoing edge from a neighbor node 710.

In like manner, both RR- and FR-edge that are not triangle edges are both shown by FIG. 7 to be incoming to egonet 700. A component 712 of an RR-edge is an incoming edge to a neighbor node 714, and a component 716 of an FR-edge is an incoming edge to a neighbor node 718.

In a useful implementation, second stage reducer 308 can use a process as described above to determine the incoming, outgoing and triangle edges, for each egonet of the graph. In one approach, the F- and R-edges of the same key node would be loaded into memory. Each of these edges would then be successively compared with each indirect edge having the same key node, in order to indentify matching edges. After determining the respective egonet edges, features such as the features shown in FIG. 2 can readily be computed for the egonet.

In a further implementation, a platform could be provided that included multiple processing systems, such as ten computers under the control of a master computer. After establishing assigning edges to groups according to key node, the master would direct each of the ten computers to route different edge groups to different computers, for processing in parallel. The master would then retrieve respective processing results from computers and selectively combine the results.

Figure 8:
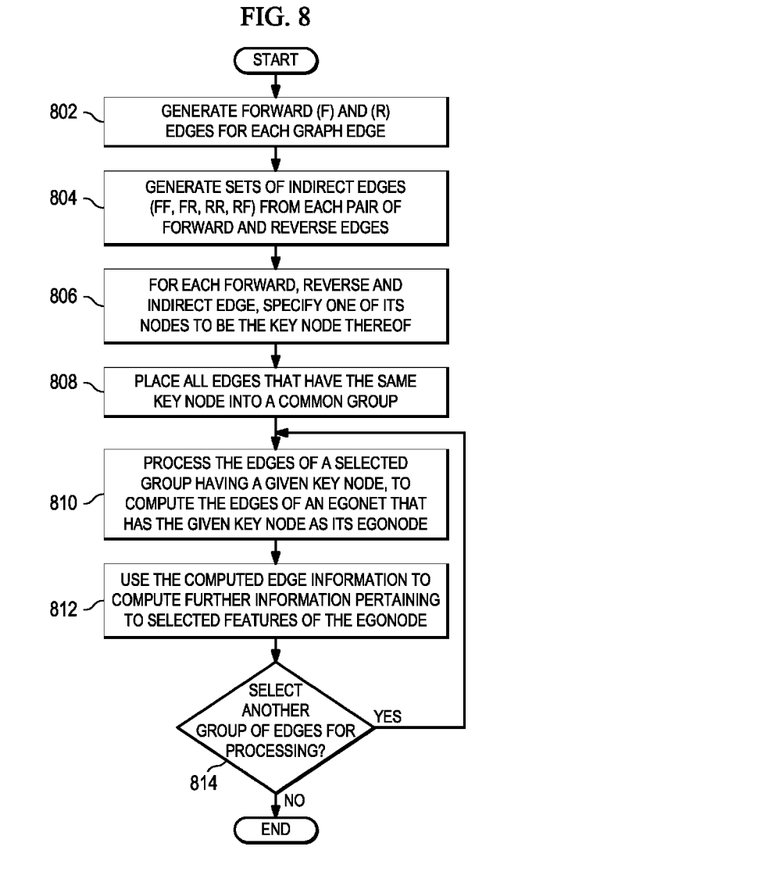
FIG. 8 is a flowchart showing steps for a method comprising an embodiment of the invention.

Referring to FIG. 8, there are shown steps for a method for comprising an embodiment of the invention. At step 802, Forward and Reverse edges are generated for each edge of directed weighted graph as described above. At step 804, sets of indirect edges, that is FF-, FR-, RR-, and RF-edges, are produced from each pair of Forward and Reverse edges. Then, a key node is selected for Forward, Reverse and indirect edges at step 806.

Referring further to FIG. 8, step 808 places all edges that have the same key node into a common group. Respective edges of a group having a given key node are processed at step 810, in order to compute the edges of an egonet that has the given key node as its egonode. At step 812, the computed edge information is used to compute further information pertaining to selected features of the egonode.

Step 814 is a decision step, for determining whether or not the edges of another group, identified by a different key node, should be selected for processing. If so, the method of FIG. 8 carries out steps 810 and 812 for that edge group, and otherwise, the method ends.

Figure 9:
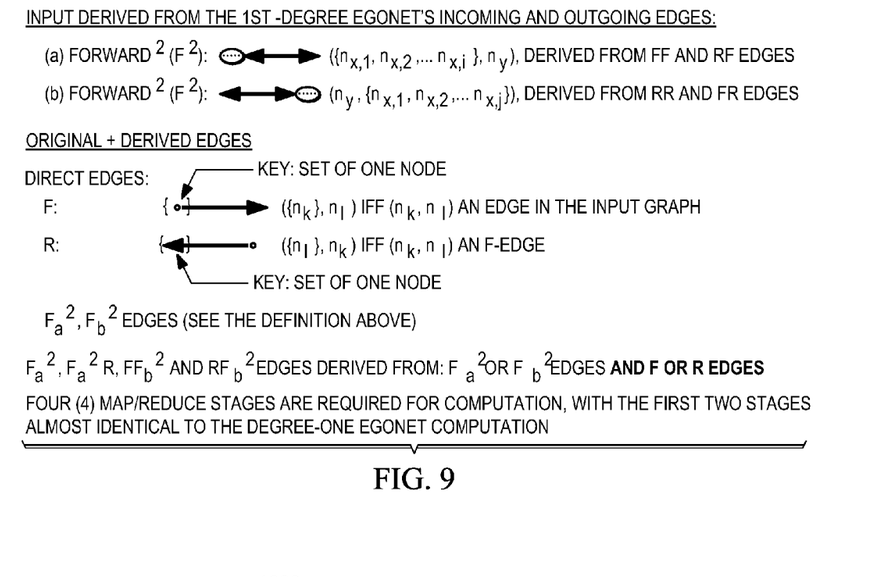
FIG. 9 is a schematic diagram illustrating direct and indirect edges provided by an embodiment of the invention for a 2nd-degree egonet computation.

Referring to FIG. 9, there are shown the edges and pseudo-edges required for a second-degree egonet computation. The input for the second- (or k-) degree egonet computation is an extension of the original graph, where for each node of the original graph, a pseudo-node is added that represents the node's (k−1)-degree egonet. This provides an enhanced graph. There are no edges between pseudo-nodes in the enhanced graph, but there are edges between pseudo-nodes and the nodes in the original graph. The forward (F-) and reverse (R-) edges in FIG. 9 are the same edges as the forward and reverse edges for the $1^{st}$-degree egonet computation in FIG. 4.

The enhanced graph includes an edge from the pseudo-node corresponding to the (k−1)-degree egonet of node x to a node y in the original graph, if the original graph contains at least one edge going from one of the nodes in the (k−1)-degree egonet to node y. The weight w of the edge from the pseudo-node and y is the sum of the weights for all such edges. For the case of $2^{nd}$-degree egonet computations, this type of edge is illustrated in FIG. 9 as case (a) of an $F^2$ edge, where $n_{x,1}, \ldots n_{x,i}$ are the i nodes in x's degree egonet such that there is an edge from $n_{x,i}$ to node y, or $n_y$, in the original graph.

Similarly, the enhanced graph includes an edge from a node y and the pseudo-node corresponding to the (k−1)-degree egonet of node x, if the original graph contains at least one edge going from y to at least one of the nodes in the (k−1)-degree egonet of x. The weight w of the edge from y and the pseudo-node is the sum of the weights for all such edges.

For the case of $2^{nd}$-degree egonet computations, this type of edge is illustrated in FIG. 9 as case (b) of an $F^2$ edge, where $n_{x,1}, \ldots n_{x,i}$ are the i nodes in x's $1^{st}$-degree egonet such that there is an edge from node y, or $n_y$, to $n_{x,i}$, in the original graph.

Similar to the $1^{st}$-degree egonet algorithm, where the mapper of the first stage generates an R-edge for each F-edge, the $2^{nd}$-degree egonet algorithm generates an R edge for each F edge, as shown in FIG. 9.

As for the other type of pseudo-edges, the $2^{nd}$-degree algorithm uses the following four types of indirect edges: $F_a^2F$, $F_a^2R$, $FF_b^2$ and $RF_b^2$. These edges are derived from either an $F_a^2$ or $F_b^2$ edge concatenated with an F or R edge subject to a very similar condition, namely that the ordinary node endpoint of an $F_a^2$ or $F_b^2$ indirect edge (not the pseudo-node) is identical to the first element of the triple representing the F- or R-edge used in the derivation. The weight of the derived edge is set to the weight of the F- or R-edge used in the derivation. The leftmost node of any of the $F_a^2F$, $F_a^2R$, $FF_b^2$ and $RF_b^2$ edges is set to the special node representing the $1^{st}$-degree egonet. It is important to understand that the rightmost node of an $F_a^2F$, $F_a^2R$, $FF_b^2$ and $RF_b^2$ indirect edge is a single node that is not included in the $1^{st}$-degree egonet.

In the general case of a k-degree egonet computation algorithm, the $F^k$ edges are defined starting with the set of nodes in the (k−1)-degree egonet and the edges from/to these nodes to the rest of the graph, while the four types of indirect edges ($F_a^kF$, $F_a^kR$, $FF_b^k$ and $RF_b^k$), and the weights of these edges, are derived the same way as for the $2^{nd}$-degree algorithm. The above observation applies to degrees K higher than two as well.

Four map-reduce stages are required to compute edges for a $2^{nd}$-degree egonet, wherein the first two stages are very similar to those for the one-degree egonet computation.

Figure 10:
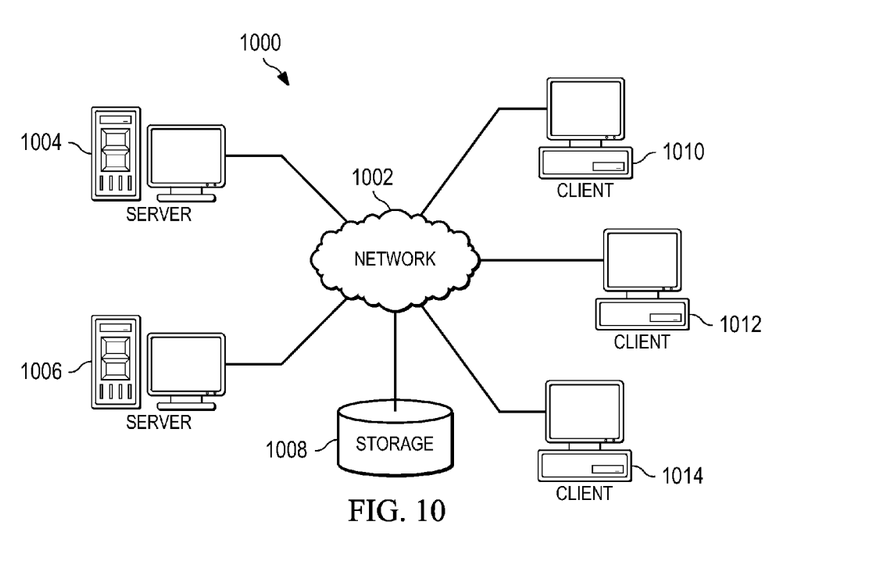
FIG. 10 is a block diagram showing a network of data processing systems in which an embodiment of the invention may be implemented.

FIG. 10 is a pictorial representation of a network of data processing systems in which illustrative embodiments may be implemented. Some of these data processing systems may be used for parallel processing, as described above. Network data processing system 1000 is a network of computers in which the illustrative embodiments may be implemented. Network data processing system 1000 contains network 1002, which is the medium used to provide communications links between various devices and computers connected together within network data processing system 1000. Network 1002 may include connections, such as wire, wireless communication links, or fiber optic cables.

In the depicted example, server computer 1004 and server computer 1006 connect to network 1002 along with storage unit 1008. In addition, client computers 1010, 1012, and 1014 connect to network 1002. Client computers 1010, 1012, and 1014 may be, for example, personal computers or network computers. In the depicted example, server computer 1004 provides information, such as boot files, operating system images, and applications to client computers 1010, 1012, and 1014. Client computers 1010, 1012, and 1014 are clients to server computer 1004 in this example. Network data processing system 1000 may include additional server computers, client computers, and other devices not shown.

Program code located in network data processing system 1000 may be stored on a computer-recordable storage medium and downloaded to a data processing system or other device for use. For example, program code may be stored on a computer-recordable storage medium on server computer 1004 and downloaded to client computer 1010 over network 1002 for use on client computer 1010.

In the depicted example, network data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 1000 also may be implemented as a number of different types of networks, such as, for example, an intranet, a local area network (LAN), or a wide area network (WAN). FIG. 10 is intended as an example, and not as an architectural limitation for the different illustrative embodiments.

Figure 11:
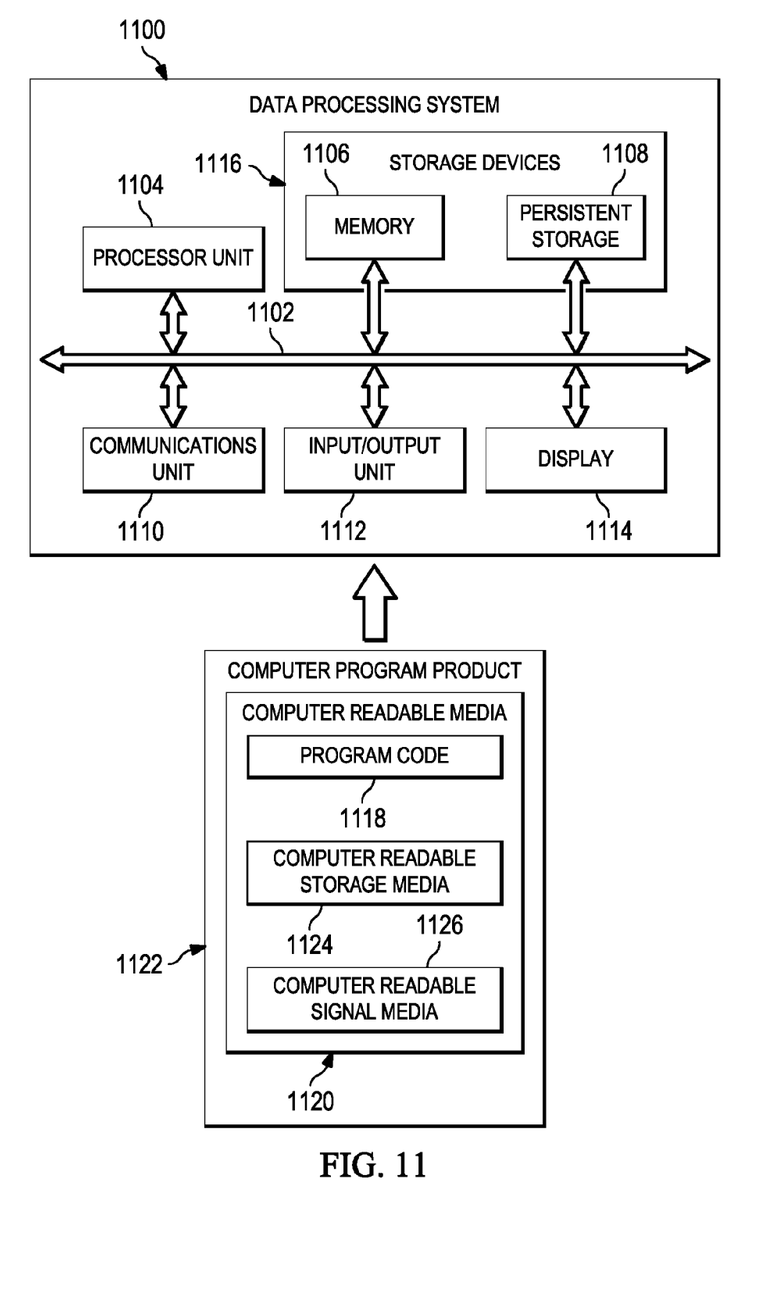
FIG. 11 is a block diagram showing a computer or data processing system that may be used in implementing embodiments of the invention.

Turning now to FIG. 11, an illustration of a data processing system is depicted in accordance with an illustrative embodiment. The data processing system may be used as one or more of the components for network system 1000. In this illustrative example, data processing system 1100 includes communications fabric 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer-readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these examples. In one example, computer-readable media 1120 may be computer-readable storage media 1124. Computer-readable storage media 1124 may include, for example, an optical or magnetic disk that is inserted or placed into a drive or other device that is part of persistent storage 1108 for transfer onto a storage device, such as a hard drive, that is part of persistent storage 1108. Computer-readable storage media 1124 also may take the form of a persistent storage, such as a hard drive, a thumb drive, or a flash memory, that is connected to data processing system 1100. In some instances, computer-readable storage media 1124 may not be removable from data processing system 1100.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

As another example, a storage device in data processing system 1100 is any hardware apparatus that may store data. Memory 1106, persistent storage 1108, and computer-readable media 1120 are examples of storage devices in a tangible form. In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106, or a cache, such as found in an interface and memory controller hub that may be present in communications fabric 1102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product executable in a computer recordable storage medium for computing specified information pertaining to respective nodes of a weighted directed graph, wherein the graph comprises multiple nodes and edges, each edge extending between two nodes and having a weight, the computer program product comprising:
    instructions for selectively processing each edge of the directed graph to generate a forward edge and reverse edge that corresponds to each edge, wherein the forward edge and reverse edge corresponding to a given edge both extend between the same two nodes as the given edge;
    instructions for selectively processing the forward edges and reverse edges to generate multiple indirect edges, wherein each indirect edge comprises two edge components, and has two ends respectively associated with different nodes;
    instructions for specifying one node associated with each forward edge, one node associated with each reverse edge, and one node associated with each indirect edge to be the key node of its respective associated edge;
    instructions for placing all the forward, reverse and indirect edges that have the same particular node as their respective key nodes into a group; and
    instructions for selectively processing all the forward, reverse and indirect edges of the group to provide specified information pertaining to a particular egonet of the graph, wherein the particular node is the egonode of the particular egonet.

2. The computer program product of claim 1, wherein:
    the forward edge corresponding to an edge has a specified source node and a specified destination node, and the reverse edge corresponding to the same edge has a source node comprising said specified destination node, and a destination node comprising said source node, of the forward edge.

3. The computer program product of claim 1, wherein:
    each forward edge and reverse edge comprises a direct edge, and each edge component of an indirect edge comprises one of said direct edges, wherein the two direct edges of a given indirect edge have a node that is common to them.

4. The computer program product of claim 1, wherein:
    each edge component of an indirect graph is selected from a set of edge components that includes forward-forward edges, forward-reverse edges, reverse-reverse edges, and reverse-forward edges, respectively.

5. The computer program product of claim 1, wherein:
    each forward edge and reverse edge comprises a direct edge, and each of said direct edges is compared with a succession of indirect edges, in order to identify edges that comprise triangle edges, incoming edges, and outgoing edges, respectively, of the particular egonet.

6. Apparatus for computing specified information pertaining to respective nodes of a weighted directed graph, wherein the graph comprises multiple nodes and graph edges, each graph edge extending between two nodes and having a weight, the apparatus comprising:
    processing means for selectively processing each edge of the directed graph to generate a forward edge and reverse edge that corresponds to each edge, wherein the forward edge and reverse edge corresponding to a given edge both extend between the same two nodes as the given edge;
    processing means for selectively processing the forward edges and reverse edges to generate multiple indirect edges, wherein each indirect edge comprises two edge components, and has two ends respectively associated with different nodes;
    processing means for specifying one node associated with each forward edge, one node associated with each reverse edge, and one node associated with each indirect edge to be the key node of its respective associated edge;
    processing means for placing all the forward, reverse and indirect edges that have the same particular node as their respective key nodes into a group; and
    processing means for selectively processing all the forward, reverse and indirect edges of the group to provide specified information pertaining to a particular egonet of the graph, wherein the particular node is the egonode of the particular egonet.

7. The apparatus of claim 6, wherein:
    the forward edge corresponding to a graph edge has a specified source node and a specified destination node, and the reverse edge corresponding to the same graph edge has a source node comprising said specified destination node, and a destination node comprising said source node, of the forward edge.

8. The apparatus of claim 6, wherein:
    each forward edge and reverse edge comprises a direct edge, and each edge component of an indirect edge comprises one of said direct edges, wherein the two direct edges of a given indirect edge have a node that is common to both of them.

9. The apparatus of claim 6, wherein:
    each edge component of an indirect graph is selected from a set of edge components that includes forward-forward edges, forward-reverse edges, reverse-reverse edges, and reverse-forward edges, respectively.

* * * * *